United States Patent
Unal et al.

(10) Patent No.: US 7,801,708 B2
(45) Date of Patent: Sep. 21, 2010

(54) METHOD AND APPARATUS FOR THE RIGID AND NON-RIGID REGISTRATION OF 3D SHAPES

(75) Inventors: Gozde Unal, West Windsor, NJ (US); Gregory G. Slabaugh, Princeton, NJ (US); Tong Fang, Morganville, NJ (US); Jason Jenn-Kwei Tyan, Princeton, NJ (US)

(73) Assignee: Siemens Corporation, Iselin, NJ (US)

( * ) Notice: Subject to any disclaimer, the term of this patent is extended or adjusted under 35 U.S.C. 154(b) by 1024 days.

(21) Appl. No.: 11/462,834

(22) Filed: Aug. 7, 2006

(65) Prior Publication Data

US 2007/0058829 A1 Mar. 15, 2007

Related U.S. Application Data

(60) Provisional application No. 60/723,660, filed on Oct. 5, 2005, provisional application No. 60/716,671, filed on Sep. 13, 2005, provisional application No. 60/723,850, filed on Oct. 5, 2005, provisional application No. 60/723,849, filed on Oct. 5, 2005.

(51) Int. Cl.
G06F 7/60 (2006.01)
G06K 9/00 (2006.01)
G06T 15/00 (2006.01)

(52) U.S. Cl. .................. 703/2; 382/128; 345/419

(58) Field of Classification Search .......... 703/2; 382/128; 345/419
See application file for complete search history.

(56) References Cited

U.S. PATENT DOCUMENTS

| | | | |
|---|---|---|---|
| 5,142,930 A | 9/1992 | Allen et al. | |
| 5,222,499 A | 6/1993 | Allen et al. | |
| 5,230,338 A | 7/1993 | Allen et al. | |
| 5,951,475 A | 9/1999 | Gueziec et al. | |
| 5,999,840 A | 12/1999 | Grimson et al. | |
| 6,096,050 A | 8/2000 | Audette | |
| 6,144,759 A | 11/2000 | Weese et al. | |

(Continued)

FOREIGN PATENT DOCUMENTS

EP 1246507 A1 10/2002

(Continued)

OTHER PUBLICATIONS

Basri, R., et al., "Determining the Similarity of Deformable Shapes," Proc. of ICCV Workshop on Physics-Based Modeling in Computer Vision, pp. 135-143, 1995.

(Continued)

*Primary Examiner*—Paul L Rodriguez
*Assistant Examiner*—Juan Ochoa

(57) ABSTRACT

A method for registering two three-dimensional shapes is disclosed whereby the two shapes are represented as zero level set of signed distance functions and the energy between these two functions is minimized. In a first embodiment, two undetailed ear impression models are rigidly registered with each other. In another embodiment, a detailed ear impression is initially aligned with an undetailed ear impression model and, then, the detailed ear impression model is rigidly registered with the undetailed ear impression model as a function of the signed distance functions. In accordance with another embodiment, an undetailed ear impression model is non-rigidly registered with a template ear impression model as a function of the signed distance functions.

24 Claims, 13 Drawing Sheets

U.S. PATENT DOCUMENTS

| | | | |
|---|---|---|---|
| 6,560,354 | B1 | 5/2003 | Maurer et al. |
| 7,328,080 | B2 * | 2/2008 | Fu et al. .................... 700/118 |
| 7,450,746 | B2 * | 11/2008 | Yang et al. .................. 382/131 |
| 2004/0107080 | A1 * | 6/2004 | Deichmann et al. ............ 703/6 |
| 2004/0165740 | A1 | 8/2004 | Fang et al. |
| 2004/0165741 | A1 | 8/2004 | Fang et al. |
| 2004/0264724 | A1 | 12/2004 | Fang et al. |
| 2006/0013482 | A1 * | 1/2006 | Dawant et al. .............. 382/173 |

FOREIGN PATENT DOCUMENTS

| | | |
|---|---|---|
| WO | WO 0230157 A2 | 4/2002 |

OTHER PUBLICATIONS

Siddiqi, K., et al., "Shock Graphs and Shape Matching," Int'l Journal of Computer Vision, vol. 35, No. 1, pp. 13-32, 1999.

Bardinet, E., et al., "Structural Object Matching," Technical Report, Dept. of Computer Science and AI, Univ. of Granada, Spain 2000.

Bloomenthal, J., et al., "Skeletal Methods of Shape Manipulation," Shape Modeling and Applications, pp. 44-47, IEEE 1999.

D.W. Storti, et al., "Skeleton-Based Modeling Operations on Solids," Solid Modeling, pp. 141-154, 1997.

Brennecke, A., et al., "3D Shape Matching Using Skeleton Graphs," Simulation and Visualization, 2004.

Maintz, J.B.A., et al., "A Survey of Medical Image Registration," Medical Image Analysis, vol, 2, No. 1, pp. 1-36, 1998.

Besl, P.J., et al., "A Method for Registration of 3-D Shapes," IEEE Trans. on PAMI, vol. 14, No. 2, pp. 239-256, 1992.

Rusinkiewicz, S., et.al., "Efficient Variants of the ICP Algorithm," in Proceedings of the Third Intl. Conf. on 3-D Digital Imaging and Modeling, 2001, pp. 1-8.

Horn, B.K.P., "Closed-Form Solution of Absolute Orientation Using Unit Quaternions," J. of Optical Soc. of Amer., vol. 4, p. 629, Apr. 1987.

Audette, M.A., et al., "An Algorithmic Overview of Surface Registration Techniques for Medical Imaging", Medical Image Analysis, Oxford University Press, 1999.

Chui, H., et al., "A New Point Matching Algorithm for Non-Rigid Registration," in Proceedings of Computer Vision and Pattern Recognition, 2000, pp. 44-51.

Huang, X., et al., "Establishing Local Correspondences Towards Compact Representations of Anatomical Structures," in MICCAI, 2003, p. 926-934.

Paragios, N., et al "Matching Distance Functions: A Shape-to-Area Variational Approach for Global-to-Local Registration," in ECCV, 2002, pp. 775-790.

Delingette, H., et al., "Shape Representation and Image Segmentation Using Deformable Surfaces," Image and Vision Comp., vol. 10, No. 3, pp. 132-144, 1992.

Hebert, M., et al, "A Spherical Representation for the Recognition of Free-Form Surfaces," IEEE Transactions on PAMI, vol. 17, No. 7, Jul. 1995.

Zhang, D., et al., "Harmonic Maps and Their Applications in Surface Matching," Proc. of IEEE Conference on Computer Vision and Pattern Recognition, 1999, vol. 2, pp. 524-530.

Johnson, A.E., et al., "Using Spin-Images for Efficient Object Recognition in Cluttered 3D Scenes," IEEE Transactions on PAMI, vol. 21, No. 5, pp. 433-449, 1999.

Solina, F., et al.,"Recovery of Parametric Models from Range Images:The Case for Superquadrics w/Global Deformations," IEEE Transactions on PAMI, vol. 12, No. 2, p. 131,1990.

Wu, K., et al., "Recovering Parametric Geons from Multiview Range Data," Proc. of IEEE Conference on Computer Vision and Pattern Recognition, pp. 159-166, 1994.

Zouhar, A., et al., "Anatomically-Aware, Automatic, and Fast Registration of 3D Ear Impression Models," 3rd Intl Symp. on 3D Data Proc. Visual. & Trans. (3DPVT) 2006.

Osada, R., et al., "Matching 3D Models with Shape Distributions," Proc. of International Conference on Shape Modeling & Applications, 2001, p. 154.

Srihari, et al., "Representation of Three-Dimensional Digital Images," Computing Surveys, vol. 13, No. 4, 1981.

Yamany, S. M., et al., "Novel Surface Registration Using the Grid Closest Point (GCP) Transform," IEEE Int'l Conf. on Image Processing, ICIP '98, vol. 3, pp. 809-813,1998.

Grenness Malcolm J et al: "Mapping ear canal movement using area-based surface matching", Journal of the Acoustial Society of America, AIP/ Acoustial Society of America, Melville, NY, US, vol. 111, No. 2, Feb. 2002, pp. 960-971.

Masuda, "Generation of geometric model by registration and integration of multiple range images", 3-D Digital Imaging and Modeling, 2001, Proceedings, Third International Conference on May 28-Jun. 1, 2001, Piscataway, NJ, USA, IEEE, May 28, 2001, pp. 254-261.

Paragios N. et al, "Non-Rigid Registration Using Distance Functions", Computer Vision and Image Understanding, Academic Press, San Diego, CA, US, vol. 89, No. 2-3, 2003, pp. 142-165.

* cited by examiner

METHOD AND APPARATUS FOR THE RIGID AND NON-RIGID REGISTRATION OF 3D SHAPES

This patent application claims the benefit of U.S. Provisional Application No. 60/723,660, filed Oct. 5, 2005, which is hereby incorporated by reference herein in its entirety.

CROSS-REFERENCE TO RELATED APPLICATIONS

The present application is also related to U.S. patent application Ser. No. 11/462,804, titled Method and Apparatus for the Registration of 3D Ear Impression Models; U.S. patent application Ser. No. 11/462,869, titled Method and Apparatus for Aperture Detection of 3D Hearing Aid Shells and U.S. patent application Ser. No. 11/462,856, titled Method and Apparatus for the Rigid Registration of 3D Ear Impression Shapes with Skeletons, all of which are being filed simultaneously herewith and are hereby incorporated by reference herein in their entirety.

BACKGROUND OF THE INVENTION

The present invention relates generally to the registration of three-dimensional objects and, more particularly, to the registration of three-dimensional undetailed and detailed ear impression models.

The manufacturing of medical devices designed to conform to anatomical shapes, such as hearing aids, has traditionally been a manually intensive process due to the complexity of the shape of the devices. FIG. 1A shows a diagram of a human ear that is, for example, the ear of a patient requiring a hearing aid. Specifically, ear 100 has various identifiable parts such as, for example, aperture 102, crus 103, canal 104, concha 105 and cymba 106. As one skilled in the art will recognize, in order to produce a hearing aid for the patient, an ear impression is typically taken. Various processes for taking such ear impressions have been developed, but most such processes typically involve inserting a pliable material into an ear and allowing that material to harden so that, when it is removed, the contours of the different parts of the ear, such as parts 102-106 of FIG. 1A, are accurately reflected on the impression. Such an ear impression reflecting the parts of ear 100 of FIG. 1A is shown in FIG. 1B. More particularly, ear impression 101 has aperture portion 102A corresponding to aperture 102 of FIG. 1A; crus portion 103A corresponding to crus 103 of FIG. 1A; canal portion 104A corresponding to canal 104 in FIG. 1A; concha portion 105A corresponding to concha 105 of FIG. 1A; cymba portion 106A corresponding to cymba 106; and lower body portion 107A.

Different methods have been used to create ear molds, or shells, from ear impressions. One skilled in the art will recognize that the terms ear mold and ear shell are used interchangeably and refer to the housing that is designed to be inserted into an ear and which contains the electronics of a hearing aid. Traditional methods of manufacturing such hearing aid shells typically require significant manual processing to fit the hearing aid to a patient's ear by, for example, sanding or otherwise removing material from the shell in order to permit it to conform better to the patient's ear. More recently, however, attempts have been made to create more automated manufacturing methods for hearing aid shells. In some such attempts, ear impressions are digitized and then entered into a computer for processing and editing. The result is a digitized model of the ear impressions that can then be digitally manipulated. One way of obtaining such a digitized model uses a three-dimensional laser scanner, which is well known in the art, to scan the surface of the impression both horizontally and vertically The result of such scanning is a digitized model of the ear impression having a plurality of points, referred to herein as a point cloud representation, forming a graphical image of the impression in three-dimensional space. FIG. 2 shows an illustrative point cloud graphical representation 201 of the hearing aid impression 101 of FIG. 1B. As one skilled in the art will recognize, the number of points in this graphical point cloud representation is directly proportional to the resolution of the laser scanning process used to scan the impression. For example, such scanning may produce a point cloud representation of a typical ear impression that has 30,000 points.

Once such a digitized model of an ear impression, also referred to herein interchangeably as an undetailed model, has been thus created, then various computer-based software tools may have been used to manually edit the graphical shape of each ear impression individually to, for example, create a model of a desired type of hearing aid for that ear. As one skilled in the art will recognize, such types of hearing aids may include in-the-ear (ITE) hearing aids, in-the-canal (ITG) hearing aids, completely-in-the-canal (CIC) hearing aids and other types of hearing aids. Each type of hearing aid requires different editing of the graphical model in order to create an image of a desired hearing aid shell size and shape according to various requirements. These requirements may originate from a physician, from the size of the electronic hearing aid components to be inserted into the shell or, alternatively, may originate from a patient's desire for specific aesthetic and ergonomic properties.

Once the desired three-dimensional hearing aid shell design is obtained, various computer-controlled manufacturing methods, such as well known lithographic or laser-based manufacturing methods, are then used to manufacture a physical hearing aid shell conforming to the edited design out of a desired shell material such as, for example, a biocompatible polymer material.

SUMMARY OF THE INVENTION

The present inventors have recognized that, while the aforementioned methods for designing hearing aid shells are advantageous in many regards, they are also disadvantageous in some aspects. In particular, prior attempts at computer-assisted hearing aid manufacturing typically treat each ear mold individually, requiring the processing of digitized representations of individual ear impressions. Such attempts have typically relied on the manual identification of the various features of an ear impression and individual editing of the graphical model of each ear impression to create a model of a desired hearing aid (e.g., corresponding to one of the aforementioned ITE, ITC or CIC hearing aid designs). The present inventors have further recognized that it is desirable to more fully automate the process of fashioning ear molds in order to decrease the time required to design the hearing aid shells.

Thus, the present inventors have invented an improved registration method for aligning two three-dimensional shapes, such as the aforementioned ear impression models. Specifically, the present inventors have recognized that it is desirable to represent two ear impression models to be registered as zero level signed distance functions and by then minimizing the energy between the two signed distance functions. In a first embodiment, two undetailed ear impression models are rigidly registered with each other. According to this embodiment, a plurality of undetailed ear impression models are registered with a template shape to determine a mean ear impression model. Then, each undetailed ear impression model is rigidly registered as a function of said signed distance functions with the mean ear impression model. In another embodiment, a detailed ear impression is initially aligned with an undetailed ear impression model and, then, the detailed ear impression model is rigidly registered with the undetailed ear impression model as a function of said signed distance functions. In accordance with another embodiment, an undetailed ear impression model is non-rigidly registered with a template ear impression model as a function of said signed distance functions. According to this embodiments an evolution stopping criteria is defined to determine when said registration is completed and a mask field is determined to prevent the evolution of at least a portion of a template. Non-rigid registration of the undetailed ear impression model and the template ear impression are accomplished as a function of said evolution stopping criteria and the mask field. These registration methods are useful for registering an undetailed ear impression either rigidly or non-rigidly to either a detailed or undetailed ear impression model to, for example, more fully automate the process of the design of hearing aid shell models.

These and other advantages of the invention will be apparent to those of ordinary skill in the art by reference to the following detailed description and the accompanying drawings.

DETAILED DESCRIPTION

Figure 1A:
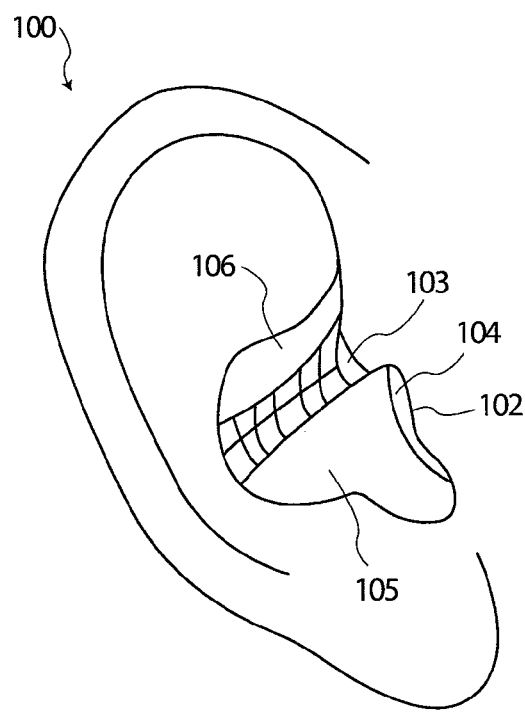
FIG. 1A shows a graphical depiction of an ear of a patient to be fitted with a hearing aid.
Figure 1B:
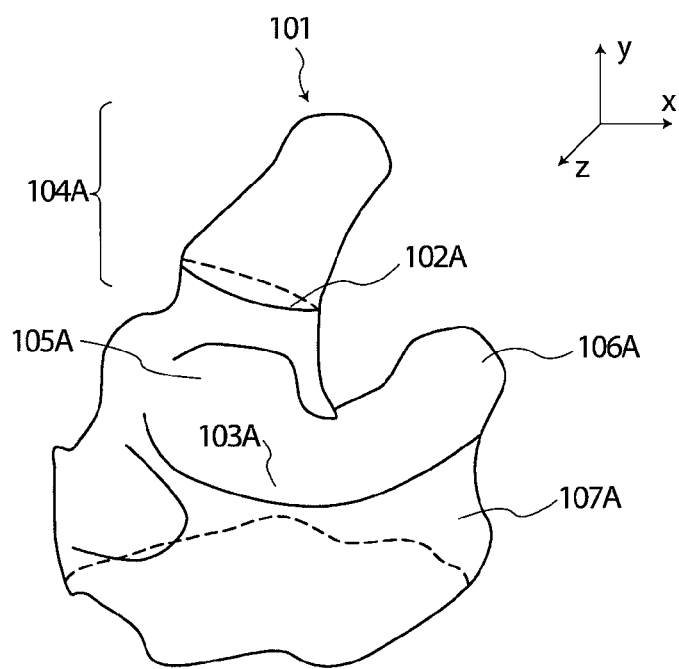
FIG. 1B shows a prior art ear impression taken of the ear of FIG. 1A.
Figure 2:
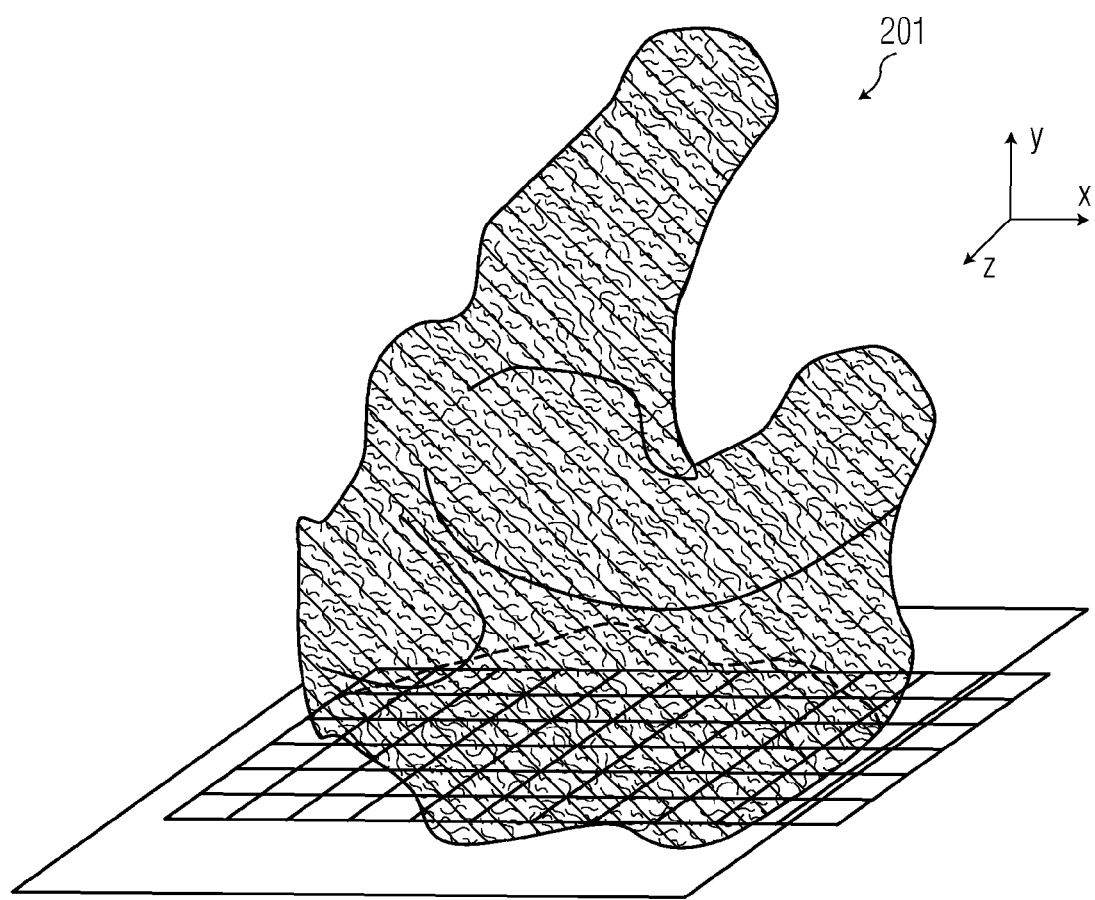
FIG. 2 shows a point cloud representation of the ear impression of FIG. 1B.

Registration of two different surfaces is a fundamental task with numerous potential applications in various fields. As is well known and as used herein, registration is generally defined as the alignment of two three-dimensional surfaces through the use of various three-dimensional transformation techniques, such as, for example, three dimensional surface rotation and translation. Registration typically involves aligning two shapes in such a way as to allow the comparison of the shapes to, for example, identify similarities and differences between those shapes. While such registration is a fundamental technique and can be very useful, the registration of two complex three-dimensional (3D) shapes, such as shapes formed by ear impressions used in the manufacture of hearing aids, is not trivial. In fact, in such cases, registration may be very computationally and practically difficult. Prior registration attempts in various fields have typically represented shapes to be registered using point-based, feature-based or model-based methods. As one skilled in the art will recognize, point-based methods model a surface by representing that surface using a number of points. For example, as discussed above, a typical representation of an ear impression may consist of 30,000 such points on the surface to be registered. Then, various calculations are made to align each point on one surface with a corresponding point on another surface. Model-based registration methods, on the other hand use statistical modeling methods, instead of surface points, to describe the surfaces of a shape. Such prior point-based and model-based registration methods typically do not attempt to simplify the representation of the surface to a more compact description of that surface (i.e., to reduce the amount of information that requires processing during registration) but, instead, use all or a large subset of all the points on the surface to describe a shape. Thus, these methods are very computationally intensive.

Feature-based methods, on the other hand, are useful for reducing the amount of information used to register two shapes. Such methods typically represent different landmarks or features of a shape as lower dimensional shapes, such as cylinders, quadrics, geons, skeletons and other such simplified geometric shapes. In such attempts, these landmarks or features on a surface are typically identified manually which increases the time required to perform the registration process. In addition, such attempts are typically not consistently repeatable due to the subjective nature of manually identifying simple shapes. Finally, as one skilled in the art will recognize, feature-based registration methods are further limited because the use of such simplified shapes typically leads to relatively rough registration results.

Therefore, the present inventors have recognized that an improved registration process would be advantageous to more fully automate the manufacture of hearing aid shells. In particular, the present inventors have recognized that, in various aspects of the hearing aid design and manufacturing process, models of hearing aid impressions can be registered together using novel rigid or non-rigid registration techniques. Each of the ear impressions to be registered may be either detailed or undetailed. As used herein, the term undetailed ear impression model is defined as a model of an ear impression that has not been edited to generate a model of a hearing aid shell. Such an undetailed model may be obtained, as discussed above, via 3D scanning of a raw ear impression taken from a patient. Also, as used herein, the term detailed ear impression model is defined as a model to which editing of the ear impression model or the ear impression mold itself has already been performed to, once again, generate a model of an ear impression. Such a model may be, for example, a digital representation of a physical ear impression obtained by 3D scanning of the ear impression or, on the other hand, may illustratively be a digital representation of an ear impression obtained by digitally editing an undetailed ear impression model to design a hearing aid shell. As also used herein, the term rigid registration is defined as the process of aligning, or registering, two 3D shapes, such as detailed or undetailed ear impression models, without changing the shape of any portion any of the models that are registered. On the other hand, the term non-rigid registration is defined herein as the process of aligning, or registering, two 3D shapes, once again such as ear impression models, in a way such that one or more features of at least one of the models is allowed to change in an attempt to minimize the differences in the shape of one or more individual features of the shapes to be registered.

As discussed above, various aspects of the manufacture of a hearing aid shell may benefit from registering detailed or undetailed shells with the same type of ear impression or, alternatively, from registering undetailed ear impressions with detailed ear impressions. According to the principles of the present invention, ear impressions to be registered are represented by zero level sets of signed distance functions. Assume a set S is the set of points on the surface of a model of an ear impression. Then, as one skilled in the art will recognize, a signed distance function of set S determines how close a given point x is to the boundary of S, i.e., the surface of the model. The function has, for example, positive values at points x inside S. The values decrease as x approaches the boundary of S, where the signed distance function is zero, and has negative values outside of S. Thus, for any distance away from the shape, the value of the function will be either positive or negative. According to this embodiment, an energy minimization framework is used to register two shapes with one another. For instance, such registration is based on defining a generic energy of the surface which is then propagated to minimize this energy. For aligning shapes, an energy function that depends on the registration (the transformation) between two shapes is defined. This energy function is then minimized to solve for the unknown registration. Specifically, let T be a transformation T:$R^3 \rightarrow R^3$ which maps, for example, one shape onto another shape. For an energy between the two shapes $\Phi_1$ and $\Phi_2$, a total squared Euclidean distance function can be defined as $$E(T)=\int_\Omega [\Phi_1(X)-\Phi_2(T(X))]^2 dX \quad \text{(Equation 1)}$$

where $\Omega$ in $R^3$ (3-dimensional Euclidean space) is the domain on which the signed distance functions are defined; $\Phi_1$ and $\Phi_2$ are the signed distance functions of the two shapes; and X is the variable on $\Omega$.

As discussed above, in some embodiments of hearing aid manufacture and design, it may be desirable to register two ear impression models with each other using rigid registration techniques. One skilled in the art will recognize that such registration may be desired between two models that are obtained from the 3D scanning of ear impressions or, alternatively, between one scanned model and a template obtained from combining previously scanned ear impressions. Regardless whether between two actual undetailed ear impression models or between a template and an actual ear impression model, for a rigid registration g between these models, the energy and its first variation with respect to the registration parameters $g_i$, i=1, ..., n may be defined as:

$$E(g)=\int_\Omega [\Phi_1(X)-\Phi_2(g(X))]^2 dX \quad \text{(Equation 2)}$$

and:

$$\frac{\partial g}{\partial t} = \int_\Omega \begin{bmatrix} \Phi_1(X) - \\ \Phi_2(g(X)) \end{bmatrix} < \nabla \Phi_2(g(X)), \frac{\partial g(X)}{\partial g_i} > dX \quad \text{(Equation 3)}$$

where the variables are as described above; $\nabla$ is the gradient operator; and where the rigid registration function g is defined as g(X)=RSX+T with a non-uniform scaling in three directions. Thus, for an energy between two shapes $\Phi$ and $\Phi_T$, a total squared Euclidean distance function may be defined as:

$$E(g)=\int_\Omega \chi_\alpha(\Phi_T(X),\Phi(g(X)))[\Phi_T(X)-\Phi(g(X))]^2 dX \quad \text{(Equation 4)}$$

where $$\chi_\alpha = \begin{cases} 0, \min(|\Phi|, |\Phi_T|) > \alpha \\ 1, \min(|\Phi|, |\Phi_T|) < \alpha \end{cases} \quad \text{(Equation 5)}$$

and where $<\cdot, \cdot>$ represents an inner product and where $\chi_\alpha$ is a characteristic function used to reduce computational complexity such that only a limited number of points around the surfaces to be registered are considered in the registration computations. Specifically, only points in a band of radius a around each shape are considered, where $\alpha$ is a function of the expected maximum distance between the two shapes to be registered. The value of $\alpha$ may be set, illustratively, as $\alpha$=10.

Thus, the first variation of Equation 4 with respect to the registration parameters $g_i$, i=1, ..., n is given by:

$$\frac{\partial g}{\partial t} = \int_\Omega \chi_\alpha(\Phi(X), \Phi_T(g(X)))[\Phi(X) - \Phi_T(g(X))] < \nabla \Phi_T(g(X)), \frac{\partial g(X)}{\partial g_i} > dX \quad \text{(Equation 6)}$$

where, once again, the variables are as described above. As one skilled in the art will recognize, the solution to Equation 6 will provide the parameters that describe the rotation, translation and nonuniform scaling necessary to accomplish the registration of the two 3D shapes.

Figure 3:
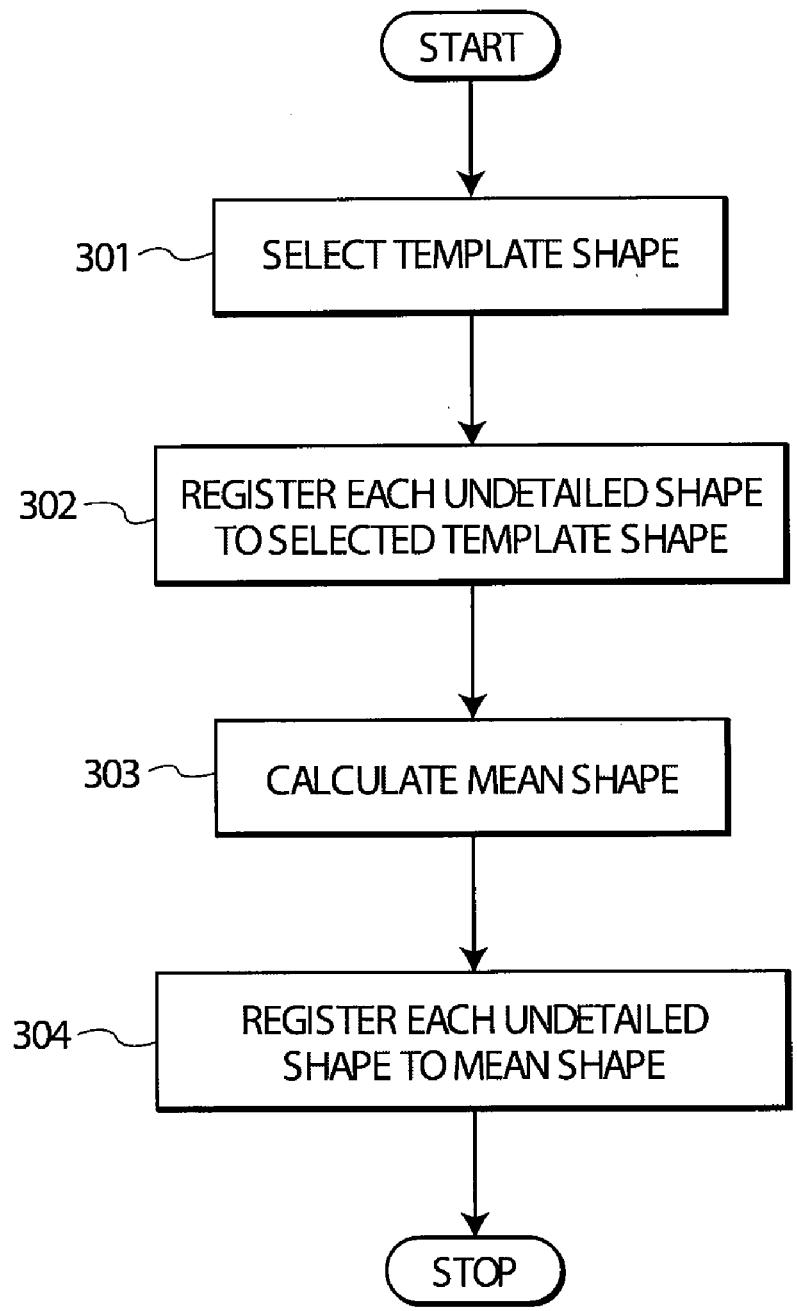
FIG. 3 is a flowchart showing the steps of a first method for rigid registration of two 3D shapes in accordance with an embodiment of the present invention.
Figure 4A:
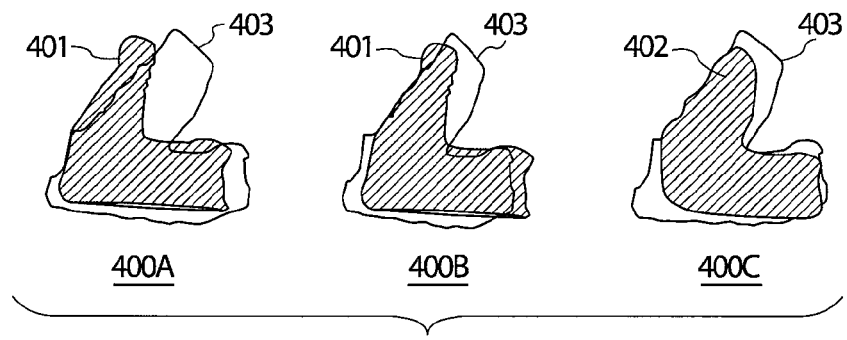
FIGS. 4A, 4B and 4C show graphical representations of the registration of three undetailed ear impression models to a template ear impression model in accordance with the method of FIG. 3.
Figure 4B:
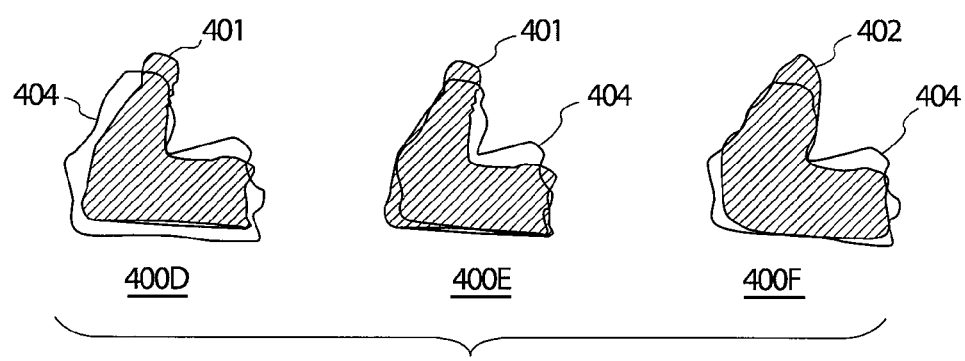
Figure 4C:
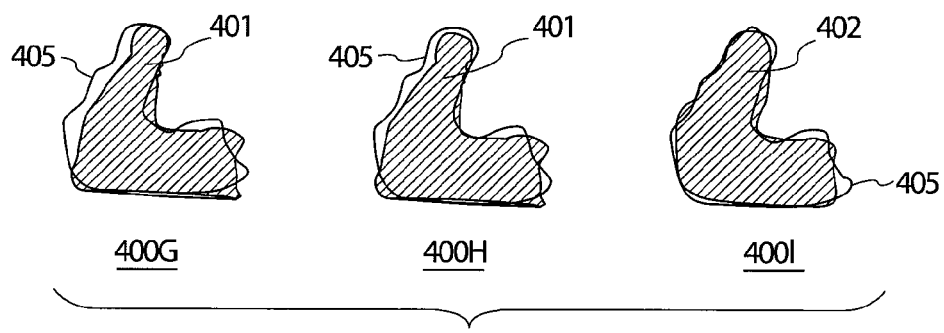

Such a registration may be useful in various aspects of hearing aid shell design. In one illustrative embodiment, for example, it may be desirable to compare a particular undetailed ear impression model to a mean ear impression model representing an average of all shells observed to date. Such a comparison may be useful in manufacturing operations as a gauge of the differences between new ear impression models and an average ear impression based ear impression models observed over time. FIG. 3 shows the steps of a method for accomplishing such a comparison of an ear impression model to a model of an average ear impression. First, at step 301, an initial template of an ear impression is selected. As one skilled in the art will recognize, such an initial template may be a randomly selected ear impression model or may be an ear impression model selected as a representative estimate of an average model. Then, once such a template is selected, two iterations of the registration process are performed. First, at step 302, all shapes received over a desired period of time are registered to the initial template. For example, these shapes could be prior ear impression models previously received for processing and/or the design of a hearing aid. Then, at step 303, after each shape is registered to the template shape a mean ear impression model is computed. Finally, at step 304, an undetailed ear impression model, such as one for which the manufacturing of a hearing aid is desired, is registered to the mean ear impression model. FIGS. 4A, 4B and 4C show examples of the registration method of FIG. 3 in which three different ear impression models 403, 404 and 405 are first registered with an initial template of an ear impression model and are then registered with an average ear impression model 402. Specifically, as shown in FIGS. 4A, 4B and 4C, and as described in the steps above in FIG. 3, undetailed ear impression models 403, 404 and 405, respectively, are first registered with template 401. The first example 400A, 400D and 400G of each of FIGS. 4A, 4B and 4C, respectively, shows a rough initial alignment of the undetailed ear impression model of that respective figure. Then, the second example, 400B, 400E and 400H of each respective figure, shows the initial registration results, as described above, of the ear impression model 403, 404 and 405, once again respectively, with the initial template. Illustratively, the second example 400B, 400E and 400H each represents the registration result after 50 iterations of Equation 6 shown herein above. As discussed above, such a registration step may be useful to generate and/or update the mean model of an ear impression model. Then, in the third example, 400C, 400F and 400I of each of FIGS. 4A, 4B and 4C, respectively, each of ear impression models 403, 404 and 405 are registered with the mean ear impression model 402 in order to determine, for example, the differences, similarities or common features that exist between each respective model and the mean ear impression model. Once again, the registration results in examples 400C, 400F and 400I of FIGS. 4A, 4B and 4C are the results obtained after 50 iterations of Equation 6.

Figure 5:
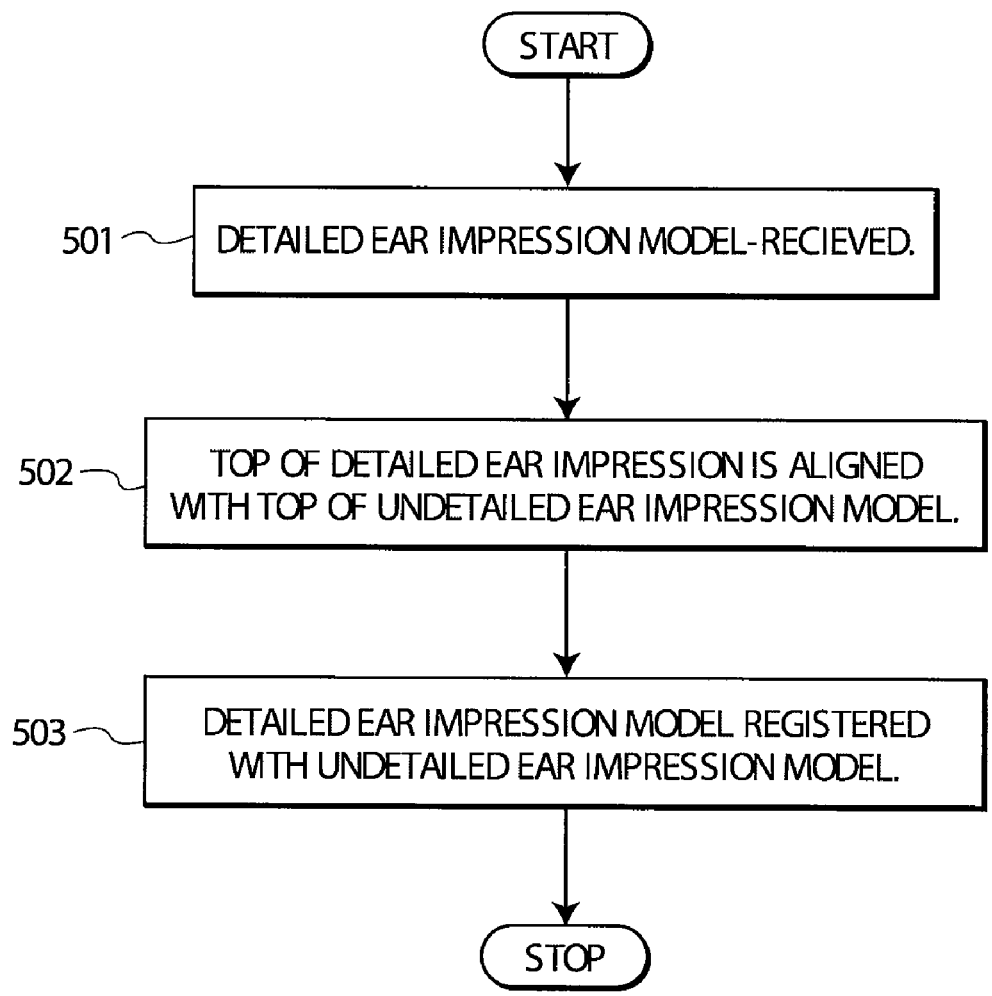
FIG. 5 is a flow chart showing the steps of a method for registering an undetailed ear impression model with a detailed ear impression model in accordance with an embodiment of the present invention.
Figure 6A:
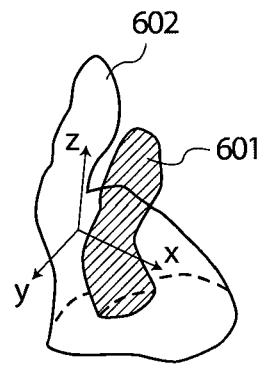
FIGS. 6A-6F show graphical representations of how a detailed ear impression model can be initially aligned with an undetailed ear impression model in accordance with the method of FIG. 5.
Figure 6B:
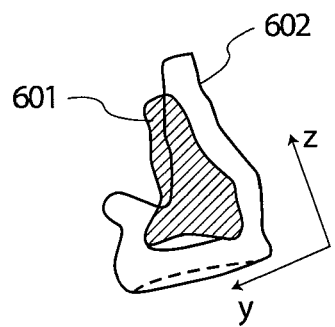
Figure 6C:
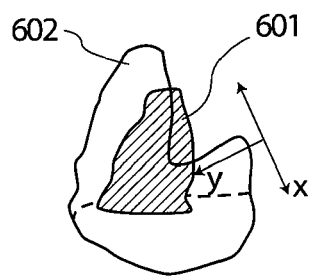
Figure 6D:
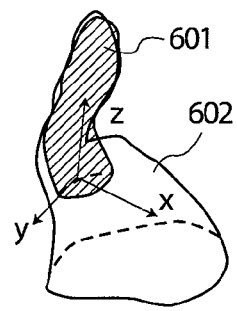
Figure 6E:
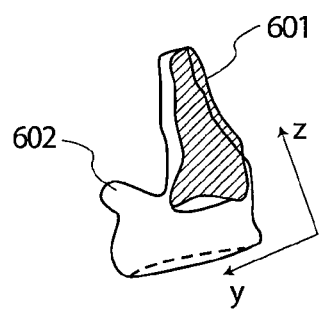
Figure 6F:
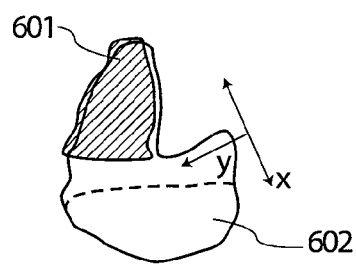

The foregoing discussion illustrates an embodiment of registering two undetailed ear impression models. It is also desirable in some cases to register a detailed ear impression model (e.g., such as a model of a final hearing aid shell design) with an undetailed model. Illustratively, such a registration may be desirable to compare a detailed model to the original ear impression for a patient. FIG. 5 is a flow chart showing the steps of such a registration between a detailed ear impression model and an undetailed ear impression model. FIGS. 6A-6F graphically represent these steps. Specifically, referring to FIGS. 5 and 6, at step 501 a detailed ear impression model, such as the detailed ear impression model 601 of FIGS. 6A-6F is received in, for example, a computer aided design program adapted to manipulate that model. Detailed ear impression model 601 is, for example, a hearing aid shell designed from undetailed ear impression model 602, also in FIGS. 6A-6F. FIGS. 6A-6C show three different views of detailed ear impression model 601 graphically overlaid in 3D space on undetailed ear impression model 602. As one skilled in the art will recognize, in FIGS. 6A-6C the two models are not initially aligned. Then, at step 502, the top of detailed ear impression model 601, representing the canal tip portion of the detailed ear impression model, is aligned with the top of undetailed ear impression model 602. Such an initial alignment is shown in FIGS. 6D-6F. This is desirable in order to reduce the number of iterations necessary to register the two ear impression models and, as a result, decrease the amount of time such registration requires. As one skilled in the art will recognize, such an initial alignment may be achieved either by manually positioning the top of the detailed model 601 in proximity with the top of the undetailed model or, alternatively, by automatic detection of the top of each ear impression using, for example, software adapted to perform such a function when operating on a suitable computer.

Once the foregoing initial alignment is accomplished, then referring once again to FIG. 5, at step 503, the two ear impression models are registered. As one skilled in the art will recognize in light of the foregoing, applying a rigid registration technique as described above in association with FIGS. 3 and 4A, 4B and 4C will typically not provide satisfactory results, even when an initial alignment of the undetailed and detailed ear impression models is performed. The reason is that the detailed shape, herein designated as $\Phi_d$, is significantly smaller than the undetailed shape, designated $\Phi_u$. Accordingly, since the energy function of Equation 4, discussed above, functions to minimize the symmetric distance between two shapes, the various parts of the undetailed shape that do not exist in the detailed shell will influence the registration and will result in misalignment of the two ear impression models. Thus, in order to avoid this problem, an asymmetric distance can be used in the energy function that restricts the portion of the undetailed ear impression to be used for registration. Using such an asymmetric distance, the energy function can be written as:

$$E(g) = \int_\Omega \chi_\beta(\Phi_u(X), \Phi_d(g(X)))[\Phi_u(X) - \Phi_d(g(X))]^2 dX \quad \text{(Equation 7)}$$

where the variables are as described above and where:

$$\chi_\beta = \begin{cases} 0, & \max(|\Phi_u|, |\Phi_d|) > \beta \\ 1, & \max(|\Phi_u|, |\Phi_d|) < \beta \end{cases} \quad \text{(Equation 8)}$$

As a result, the corresponding asymmetric rigid registration equation is:

$$\frac{\partial g}{\partial t} = \int_\Omega \chi_\beta(\Phi(X), \Phi_T(g(X))) \begin{bmatrix} \Phi(X) - \\ \Phi_T(g(X)) \end{bmatrix} < \nabla \Phi_T(g(X)), \quad \text{(Equation 9)}$$

$$\frac{\partial g(X)}{\partial g_i} > dX$$

Figure 7A:
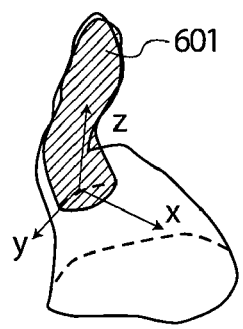
FIGS. 7A-7C show graphical representations of how a detailed ear impression model can be registered with an undetailed ear impression model after the initial alignment of FIGS. 6A-6F and in accordance with the method of FIG. 5.
Figure 7B:
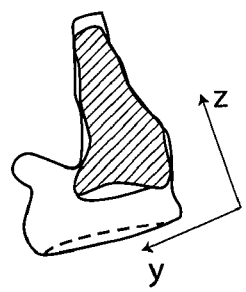
Figure 7C:
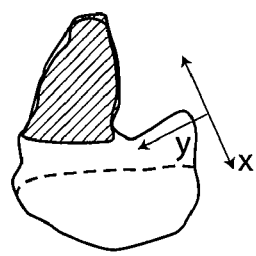
Figures 8A, 8B, 8C, 8D:
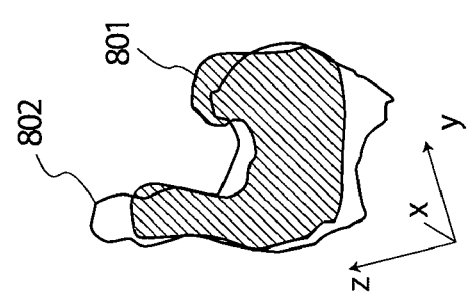
FIGS. 8A-8D show graphical representations of unconstrained non-rigid registration of an undetailed ear impression model with a template ear impression model.

Accordingly, as one skilled in the art will recognize, and as is shown in FIGS. 7A, 7B and 7C, the detailed shape 601 is registered with the detailed shape 602.

Thus far, the description has been limited to rigid registration methods of undetailed ear impression models to either other undetailed models or templates or, alternatively, to detailed ear impression models. However, non-rigid registration may also be desirable in certain uses. As discussed previously, the term non-rigid registration is defined herein as the process of aligning, or registering, two 3D shapes in a way such that local variations of one of the models are allowed to change in an attempt to minimize its geometric difference with respect to the other shape. In order to accomplish such a non-rigid registration between, for example, a newly received ear impression model and a mean ear impression model based, as discussed above, on a plurality of ear impression models received over time, let U be a 3D deformation field where $U:R^3 \to R^3$. Then, by denoting the deformation field as $T(X) = X + U(X)$, the energy function can be written as:

$$E(U) = \int_\Omega [\Phi_1(X) - \Phi_2((X+U))]^2 dX + f \|\nabla U(X)\|^2 dX \quad \text{(Equation 10)}$$

and by using the well-known Euler-Lagrange equations, partial differential equations describing the evolution of the vectors of a 3D surface can be written as:

$$\frac{\partial U(X,t)}{\partial t} = [\Phi_1(X) - \Phi_2((X+U)]\nabla \Phi_2(X+U(X)) + \alpha \Delta U \quad \text{(Equation 11)}$$

where:

$$U(X,0) = 0 \quad \text{(Equation 12)}$$

Thus, the estimated deformation field U can be used to deform the surface $S_2$ towards the desired surface $S_1$ according to the equation:

$$\frac{\partial S_2}{\partial t} = (U \cdot N)N \quad \text{(Equation 13)}$$

where N is the unit normal vector to surface $S_2$. However, as one skilled in the art will recognize, a stopping criterion must be used in order to stop the evolution of the second surface $S_2$ when it converges onto the first surface $S_1$, i.e. when it reaches $\Phi_1$ in its signed distance representation. A squared Euclidean distance can be defined between the two shapes in order to provide such a stopping criteria on the flow. Such a distance can be written as:

$$\frac{\partial \Phi_2}{\partial t} = [\Phi_1(X) - \Phi_2((X+U)]^2 \left( U \cdot \frac{\nabla \Phi_2}{\|\nabla \Phi_2\|} \right) \|\nabla \Phi_2\| \quad \text{(Equation 14)}$$

where the variables are as described herein above.

FIGS. 8A-8D show a sample evolution of a template shape 801 towards an undetailed ear impression model 802 by using the foregoing equations. In particular, FIGS. 8A-8D show how, using the foregoing equations for non-rigid registration, template shape 801 will evolve in directions 803, 804, 805 and 806 until the stopping criteria of Equation 14 is reached and the template substantially conforms to the shape of undetailed ear impression model 802. However, as one skilled in the art will recognize, evolution of the template towards the undetailed model until full convergence may not be desired since various parts of the template may have already been detailed to edit portions of the template ear impression model. Accordingly, according to another embodiment, a 3D mask field can be applied to the template 801 that will limit the evolution of that template in certain directions. Thus, the propagation of the template will only be allowed in specific regions.

Figure 9:
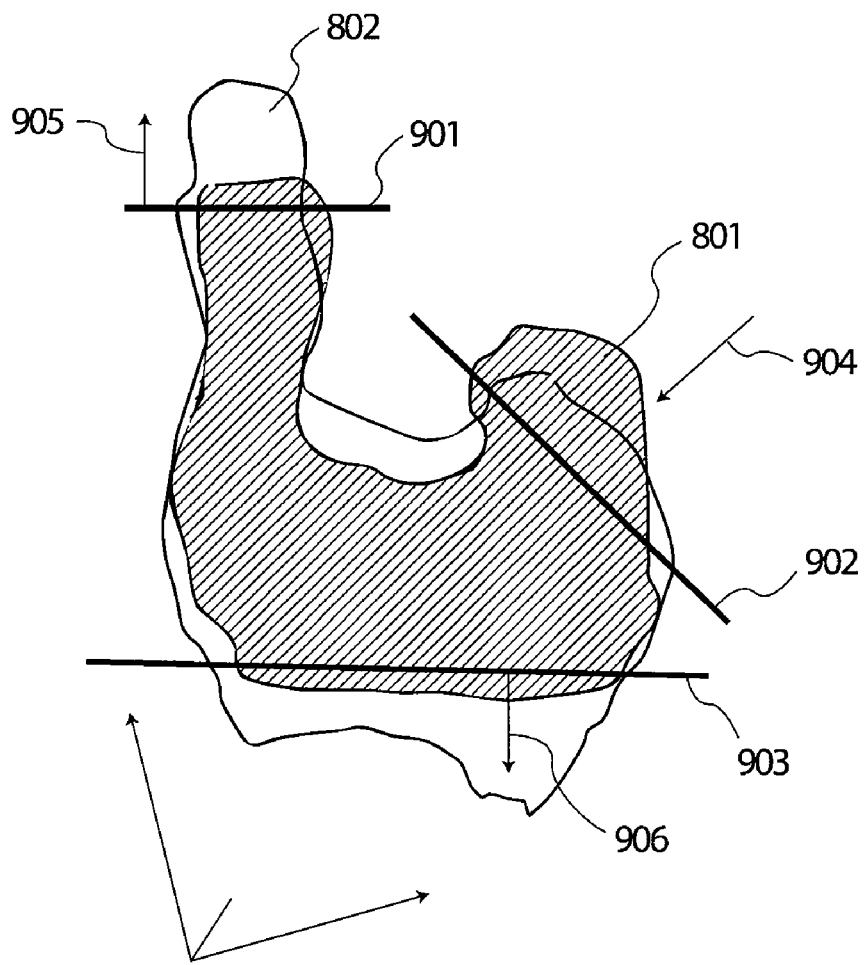
FIG. 9 shows how a mask field can be used to constrain the non-rigid registration of an undetailed ear impression model to a template ear impression model.
Figure 10A:
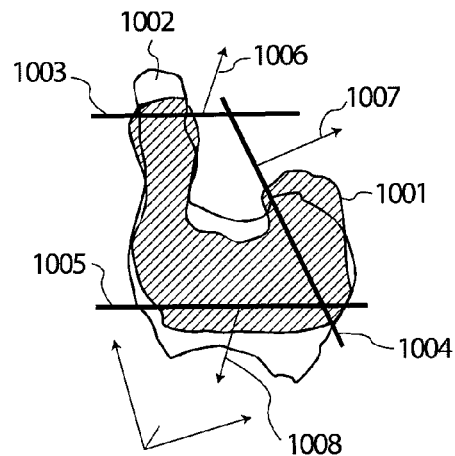
FIGS. 10A-10C show graphical representations of the non-rigid registration of an undetailed ear impression model with a template ear impression model using the mask field of FIG. 9.
Figure 10B:
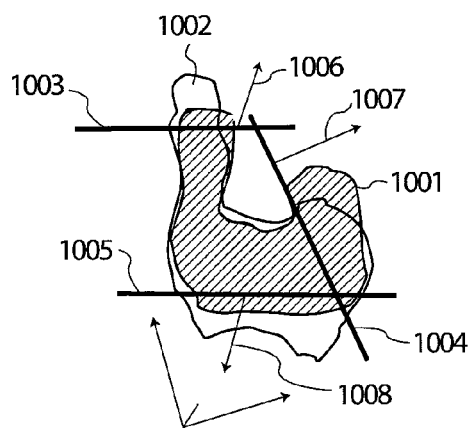
Figure 10C:
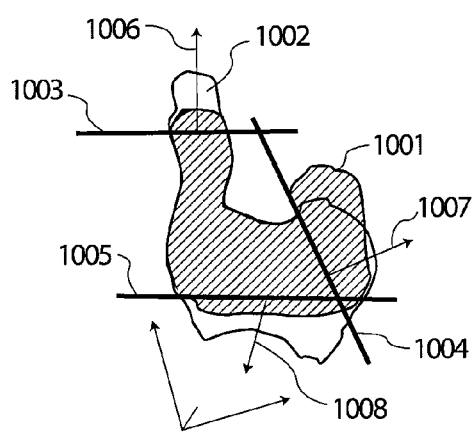

FIG. 9 shows how such a mask field can be used. In particular, a mask field M represented by lines 901, 902 and 903 corresponding to planes in $R^3$ can be used to prevent template 801 from evolving, illustratively, in directions 904, 905 and 906, since those directions represent portions of the template that have already been detailed. The regions of the template shape 801, denoted $\Phi_2$, are labeled by a "NULL=0" label so that those regions are not propagated, or evolved, towards the shape 802, denoted $\Phi_1$. A weighted flow to deform the template shape $\Phi_2$ toward the shape $\Phi_1$ can thus be written as:

$$\frac{\partial \Phi_2}{\partial t} = M(X) \left[ \begin{array}{c} \Phi_1(X) - \\ \Phi_2((X+U) \end{array} \right]^2 \left( U \cdot \frac{\nabla \Phi_2}{\|\nabla \Phi_2\|} \right) \|\nabla \Phi_2\| \quad \text{(Equation 15)}$$

in order to freeze the points of the template which are already detailed. A representative example of a resulting evolution of a template 1001 to an undetailed ear impression model 1002 is shown in FIGS. 10A-10C. Referring to those figures, mask planes 1003, 1004 and 1005 are defined, as discussed above, to prevent the evolution of template 1001 to model 1002 in directions 1006, 1007 and 1008. Thus, only the remaining portions of the template are permitted to propagate in order to conform with the undetailed ear impression model 1002 in between the constraining planes 1003, 1004, and 1005.

Figure 11:
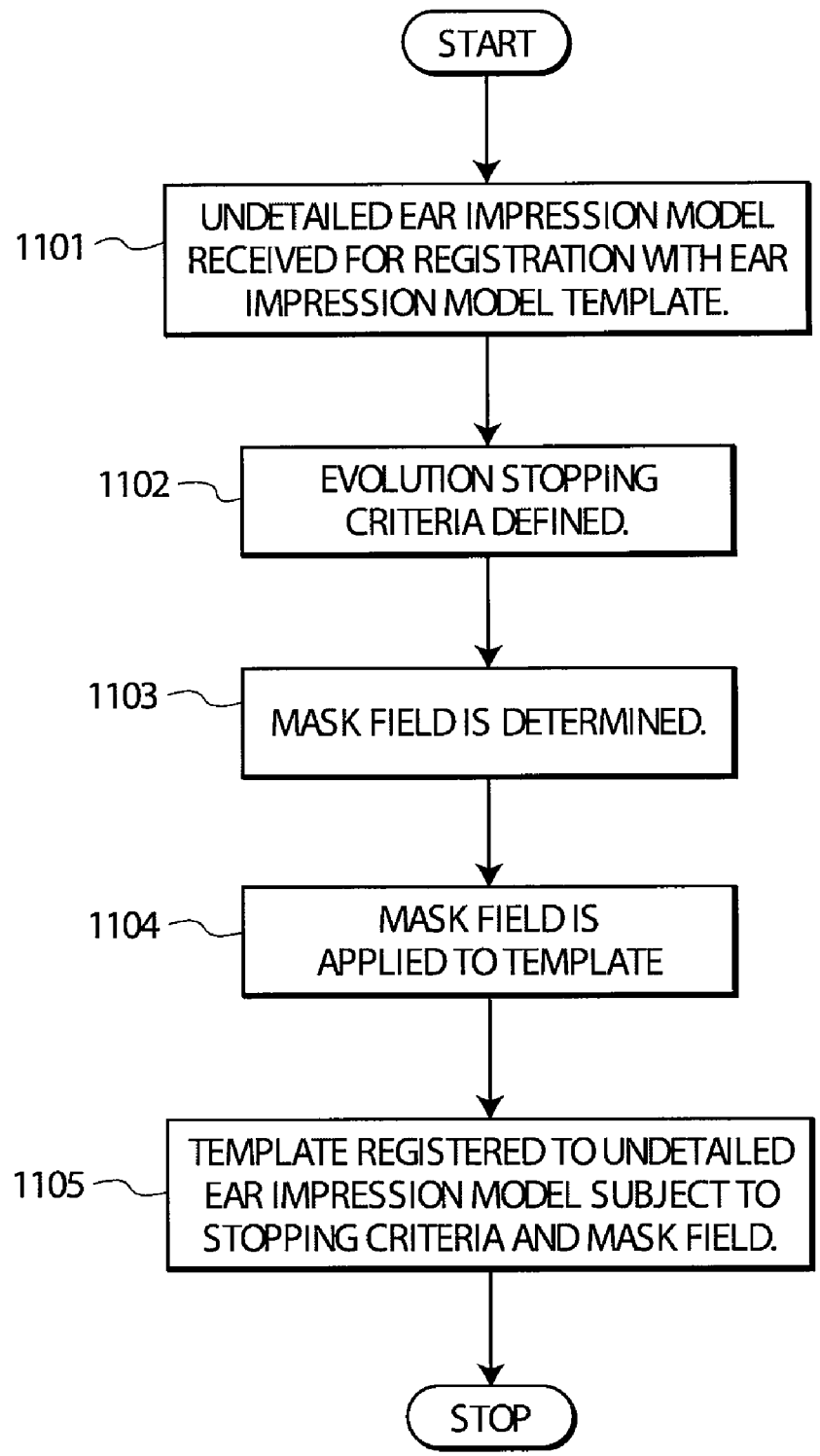
FIG. 11 is a flow chart showing the steps of a method for non-rigid registration in accordance with an embodiment of the present invention.

FIG. 11 is a flow chart showing the steps of the method described above for the non-rigid registration of, for example, a template ear impression model to an undetailed ear impression model. At step 1101, an undetailed ear impression model is received, once again in a computer aided design program, for which the registration of a template is desired. At step 1102, a stopping criteria is defined to stop the evolution of the template when it substantially conforms to the undetailed ear impression shape. At step 1103, a mask field is determined and, at step 1104, that mask field is applied to the template to prevent evolution of the template in certain directions. Then, at step 1105, the template is registered according to Equation 13, subject to the stopping criteria of Equation 14 and the mask field obtained from Equation 15.

Figure 12:
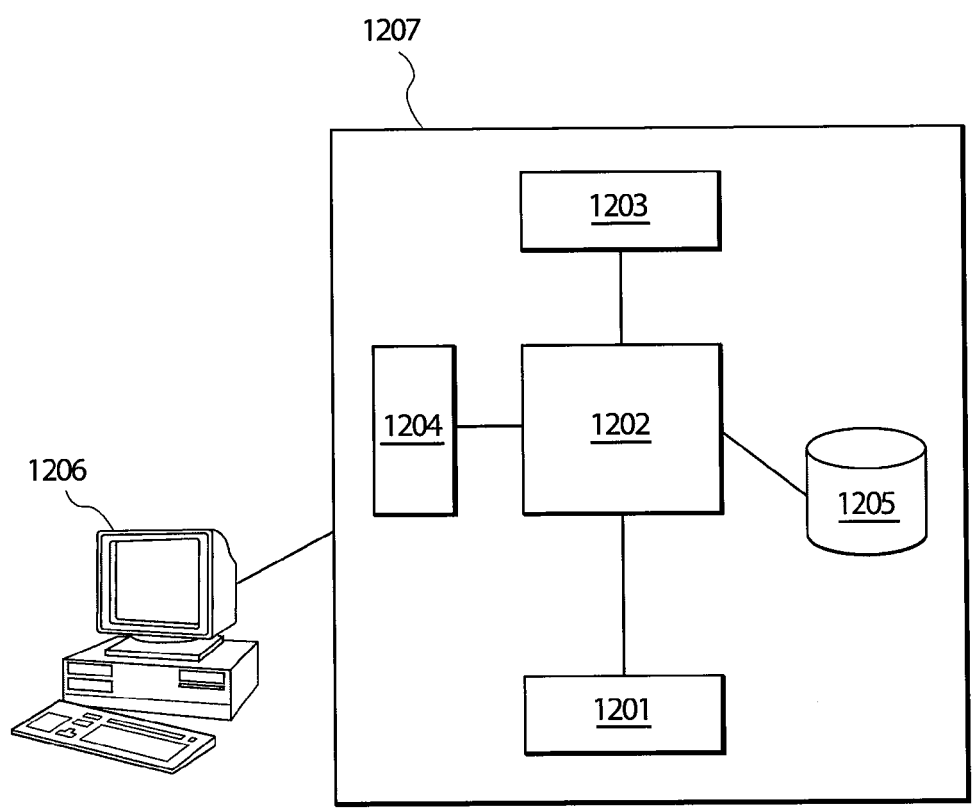
FIG. 12 is a block diagram of a computer adapted to perform rigid and non-rigid registration in accordance with the embodiments of the present invention.

The foregoing embodiments are generally described in terms of manipulating objects, such as three-dimensional shapes associated with ear impression feature identification and ear impression and shell registration. One skilled in the art will recognize that such manipulations may be, in various embodiments, virtual manipulations accomplished in the memory or other circuitry/hardware of an illustrative registration system. Such a registration system may be adapted to perform these manipulations, as well as to perform various methods in accordance with the above-described embodiments, using a programmable computer running software adapted to perform such virtual manipulations and methods. An illustrative programmable computer useful for these purposes is shown in FIG. 12. Referring to that figure, a registration system 1207 is implemented on a suitable computer adapted to receive, store and transmit data such as the aforementioned positional information associated with the surface and features of an ear impression. Specifically, illustrative registration system 1207 may have, for example, a processor 1202 (or multiple processors) which controls the overall operation of the registration system 1207. Such operation is defined by computer program instructions stored in a memory 1203 and executed by processor 1202. The memory 1203 may be any type of computer readable medium, including without limitation electronic, magnetic, or optical media. Further, while one memory unit 1203 is shown in FIG. 12, it is to be understood that memory unit 1203 could comprise multiple memory units, with such memory units comprising any type of memory. Registration system 1207 also comprises illustrative modem 1201 and network interface 1204. Registration system 1207 also illustratively comprises a storage medium, such as a computer hard disk drive 1205 for storing, for example, data and computer programs adapted for use in accordance with the principles of the present invention as described hereinabove. Finally, registration system 1207 also illustratively comprises one or more input/output devices, represented in FIG. 12 as terminal 1206, for allowing interaction with, for example, a technician or database administrator. One skilled in the art will recognize that registration system 1207 is merely illustrative in nature and that various hardware and software components may be adapted for equally advantageous use in a computer in accordance with the principles of the present invention.

One skilled in the art will also recognize that the software stored in the computer system of FIG. 12 may be adapted to perform various tasks in accordance with the principles of the present invention. In particular, such software may be graphical software adapted to import surface models from anatomical structures, for example those models generated from three-dimensional laser scanning of ear impression mode. In addition, such software may allow for selective editing of those models or that permits a user to remove or reshape various portions of those anatomical models as described above. The computer system may be adapted to automatically generate points associated with a feature, such as the aperture, of ear impressions so as to create a vector describing the shape and orientation of the feature in three-dimensional space. Such software may also function to automatically register that feature with a corresponding feature on another ear impression by calculating the three dimensional translation and rotation of the vector in order to align one ear impression model with another. The software of a computer-based system such as registration system 1207 may also be adapted to perform other functions which will be obvious in light of the teachings herein. All such functions are intended to be contemplated by these teachings.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for registering a first ear impression model in a plurality of ear impression models with a second ear impression model in said plurality of ear impression models, said method comprising:
   identifying a first signed distance function wherein a surface of a first ear impression model is defined as a zero level of said first signed distance function;
   identifying a second signed distance function wherein a surface of a second ear impression model is defined as a zero level of said second signed distance function; and
   registering the first ear impression model with the second ear impression model by minimizing an energy function representing an energy between said first signed distance function and said second signed distance function.

2. The method of claim 1 wherein said step of registering comprises:
   receiving a template ear impression model as said second ear impression model;
   registering via rigid registration said first ear impression model with said template ear impression model;
   computing a mean ear impression model as a function of said template ear impression model and said first ear impression model; and
   registering via rigid registration said first ear impression model with said mean ear impression model.

3. The method of claim 1 wherein said energy function is defined by the equation:

$$E(g) = \int_\Omega \chi_\alpha(\Phi_T(X), \Phi(g(X)))[\Phi_T(X) - \Phi(g(X))]^2 dX$$

where E is the energy function; $\chi_\alpha$ is a characteristic function used to reduce computational complexity such that only a limited number of points around the surfaces to be registered are considered in the registration computations; g is a rigid registration function $g(X) = RSX + T$ where R is the rotation, T is the translation and S is the nonuniform scaling required to map a first ear impression onto a second ear impression;
   and $\phi_T$ and $\phi$ represent signed distance functions of two ear impressions to be registered, the zero level of which correspond to the surface of each respective ear impression.

4. The method of claim 1 wherein said step of registering comprises:
   aligning a feature of said first ear impression model with a corresponding feature of said second ear impression model, said first ear impression model comprising a detailed ear impression model and said second ear impression model comprising an undetailed ear impression model;
   identifying a portion of said second ear impression to be used in registering said first and second ear impression models; and
   registering via rigid registration said first ear impression model with said second ear impression model.

5. The method of claim 4 wherein said step of identifying said portion of said second ear impression to be used in registering comprises:
   restricting the portion of said second ear impression to be registered by using asymmetric rigid registration.

6. The method of claim 5 wherein said asymmetric rigid registration is defined by the equation:

$$\frac{\partial g}{\partial t} = \int_\Omega \chi_\beta(\Phi(X), \Phi_T(g(X))) \begin{bmatrix} \Phi(X) - \\ \Phi_T(g(X)) \end{bmatrix} < \nabla \Phi_T(g(X)),$$

$$\frac{\partial g(X)}{\partial g_i} > dX$$

where g is rigid registration function $g(X) = RSX + T$ where R is the rotation, T is the translation and S is the nonuniform scaling required to map a first ear impression onto a second ear impression; and $\phi_T$ and $\phi$ represent signed distance functions of two ear impressions to be registered, the zero level of which correspond to the surface of each respective ear impression; and $\chi_\beta$ is defined as 0 for $\max(|\phi_u|, |\phi_d|) > \beta$ and where $\chi_\beta$ is defined as 1 for $\max(|\phi_u|, |\phi_d|) < \beta$, where $\phi_u$ represents the undetailed ear impression model shape and $\phi_d$ represents the detailed ear impression model shape.

7. The method of claim 1 wherein said step of registering comprises:
   receiving a template ear impression model as said second ear impression model;
   defining a non-rigid evolution stopping criteria;
   determining a mask field for preventing an evolution of at least a portion of said second ear impression model; and
   registering via non-rigid registration deformation said second ear impression model with said first ear impression model as a function of said non-rigid evolution stopping criteria and said mask field.

8. The method of claim 7 wherein said non-rigid evolution stopping criteria comprises a function for determining when at least a portion of said second ear impression model substantially conforms to said first ear impression model.

9. An apparatus for registering a first ear impression model in a plurality of ear impression models with a second ear impression model in said plurality of ear impression models, said apparatus comprising:

means for identifying a first signed distance function wherein a surface of a first ear impression model is defined as a zero level of said first signed distance function;

means for identifying a second signed distance function wherein a surface of a second ear impression model is defined as a zero level of said second signed distance function; and means for registering the first ear impression model with the second ear impression model by minimizing an energy function representing an energy between said first signed distance function and said second signed distance function.

10. The apparatus of claim 9 wherein said means for registering comprises:

means for receiving a template ear impression model as said second ear impression model;

means for registering via rigid registration said first ear impression model with said template ear impression model;

means for computing a mean ear impression model as a function of said template ear impression model and said first ear impression model; and means for registering via rigid registration said first ear impression model with said mean ear impression model.

11. The apparatus of claim 9 wherein said energy function is defined by the equation:

$$E(g) = \int_\Omega \chi_\alpha(\Phi_T(X), \Phi(g(X)))[\Phi_T(X) - \Phi(g(X))]^2 dX$$

where E is the energy function; $\chi_\alpha$ is a characteristic function used to reduce computational complexity such that only a limited number of points around the surfaces to be registered are considered in the registration computations; g is rigid registration function g(X)=RSX+T where R is the rotation, T is the translation and S is the nonuniform scaling required to map a first ear impression onto a second ear impression; and $\phi_T$ and $\phi$ represent signed distance functions of two ear impressions to be registered, the zero level of which correspond to the surface of each respective ear impression.

12. The apparatus of claim 9 wherein said means for registering comprises:

means for aligning a feature of said first ear impression model with a corresponding feature of said second ear impression model, said first ear impression model comprising a detailed ear impression model and said second ear impression model comprising an undetailed ear impression model;

means for identifying a portion of said second ear impression to be used in registering said first and second ear impression models; and means for registering via rigid registration said first ear impression model with said second ear impression model.

13. The apparatus of claim 12 wherein means for identifying said portion of said second ear impression to be used in registering comprises:

means for restricting the portion of said second ear impression to be registered by using asymmetric rigid registration.

14. The apparatus of claim 13 wherein said asymmetric rigid registration is defined by the equation:

$$\frac{\partial g}{\partial t} = \int_\Omega \chi_\beta(\Phi(X), \Phi_T(g(X)))[\Phi(X) - \Phi_T(g(X))] < \nabla \Phi_T(g(X)),$$

$$\frac{\partial g(X)}{\partial g_i} > dX$$

where g is rigid registration function g(X)=RSX+T where R is the rotation, T is the translation and S is the nonuniform scaling required to map a first ear impression onto a second ear impression; and $\phi_T$ and $\phi$ represent signed distance functions of two ear impressions to be registered, the zero level of which correspond to the surface of each respective ear impression; and $\chi_\beta$ is defined as 0 for $\max(|\phi_u|, |\phi_d|) > \beta$ and where $\chi_\beta$ is defined as 1 for $\max(|\phi_u|, |\phi_d|) < \beta$, where $\phi_u$ represents the undetailed ear impression model shape and $\phi_d$ represents the detailed ear impression model shape.

15. The apparatus of claim 9 wherein said means for registering comprises:

means for receiving a template ear impression model as said second ear impression model;

means for defining a non-rigid evolution stopping criteria;

means for determining a mask field for preventing an evolution of at least a portion of said second ear impression model; and means for registering via non-rigid registration deformation said second ear impression model with said first ear impression model as a function of said non-rigid evolution stopping criteria and said mask field.

16. The step of claim 15 wherein said non-rigid evolution stopping criteria comprises a function for determining when at least a portion of said second ear impression model substantially conforms to said first ear impression model.

17. A computer readable medium comprising computer program instructions which, when executed by a processor, define steps for registering a first ear impression model in a plurality of ear impression models with a second ear impression model in said plurality of ear impression models, said steps comprising:

identifying a first signed distance function wherein a surface of a first ear impression model is defined as a zero level of said first signed distance function;

identifying a second signed distance function wherein a surface of a second ear impression model is defined as a zero level of said second signed distance function; and registering the first ear impression model with the second ear impression model by minimizing an energy function representing an energy between said first signed distance function and said second signed distance function.

18. The computer readable medium of claim 17 wherein the computer program instructions defining the step of registering comprise computer program instructions defining the steps of:

receiving a template ear impression model as said second ear impression model;

registering via rigid registration said first ear impression model with said template ear impression model;

computing a mean ear impression model as a function of said template ear impression model and said first ear impression model; and registering via rigid registration said first ear impression model with said mean ear impression model.

19. The computer readable medium of claim 17 wherein said energy function is defined by the equation:

$$E(g)=\int_\Omega \chi_\alpha(\Phi_T(X),\Phi(g(X)))[\Phi_T(X))-\Phi(g(X))]^2 dX$$

where E is the energy function; $\chi_\alpha$ is a characteristic function used to reduce computational complexity such that only a limited number of points around the surfaces to be registered are considered in the registration computations; g is rigid registration function g(X)=RSX+T where R is the rotation, T is the translation and S is the nonuniform scaling required to map a first ear impression onto a second ear impression;

and $\phi_T$ and $\phi$ represent signed distance functions of two ear impressions to be registered, the zero level of which correspond to the surface of each respective ear impression.

20. The computer readable medium of claim 17 wherein the computer program instructions defining the step of registering comprise computer program instructions defining the steps of:

aligning a feature of said first ear impression model with a corresponding feature of said second ear impression model, said first ear impression model comprising a detailed ear impression model and said second ear impression model comprising an undetailed ear impression model;

identifying a portion of said second ear impression to be used in registering said first and second ear impression models; and registering via rigid registration said first ear impression model with said second ear impression model.

21. The computer readable medium of claim 20 wherein the computer program instructions defining step of identifying said portion of said second ear impression to be used in registering comprise computer program instructions defining the step of:

restricting the portion of said second ear impression to be registered by using asymmetric rigid registration.

22. The computer readable medium of claim 21 wherein said asymmetric rigid registration is defined by the equation:

$$\frac{\partial g}{\partial t} = \int_\Omega \chi_\beta(\Phi(X), \Phi_T(g(X)))[\Phi(X) - \Phi_T(g(X))] < \nabla \Phi_T(g(X)),$$

$$\frac{\partial g(X)}{\partial g_i} > dX$$

where g is rigid registration function g(X)=RSX+T where R is the rotation, T is the translation and S is the nonuniform scaling required to map a first ear impression onto a second ear impression; and $\phi_T$ and $\phi$ represent signed distance functions of two ear impressions to be registered, the zero level of which correspond to the surface of each respective ear impression; and $\chi_\beta$ is defined as 0 for max($|\phi_u|$, $|\phi_d|$)>$\beta$ and where $\chi_\beta$ is defined as 1 for max($|\phi_u|$, $|\phi_d|$)<$\beta$, where $\phi_u$ represents the undetailed ear impression model shape and $\phi_d$ represents the detailed ear impression model shape.

23. The computer readable medium of claim 17 wherein the computer program instructions defining the step of registering comprise computer program instructions defining the steps of:

receiving a template ear impression model as said second ear impression model;

defining a non-rigid evolution stopping criteria;

determining a mask field for preventing an evolution of at least a portion of said second ear impression model; and registering via non-rigid registration deformation said second ear impression model with said first ear impression model as a function of said non-rigid evolution stopping criteria and said mask field.

24. The computer readable medium of claim 23 wherein said non-rigid evolution stopping criteria comprises a function for determining when at least a portion of said second ear impression model substantially conforms to said first ear impression model.

* * * * *